United States Patent [19]
Kuze

[11] Patent Number: 4,828,167
[45] Date of Patent: May 9, 1989

[54] WAX-PELLET THERMOSTAT

[76] Inventor: Yoshikazu Kuze, 31-3, Higashimagome 1-chome, Ohta-ku, Tokyo, Japan

[21] Appl. No.: 60,447

[22] Filed: Jun. 11, 1987

[30] Foreign Application Priority Data

| Jun. 12, 1986 | [JP] | Japan | 61-134821 |
| Nov. 6, 1986 | [JP] | Japan | 61-262744 |
| Mar. 10, 1987 | [JP] | Japan | 62-052883 |

[51] Int. Cl.⁴ ............................................. F01P 7/02
[52] U.S. Cl. .................................... 236/34.5; 236/100
[58] Field of Search ..................... 236/34, 34.5, 100

[56] References Cited

U.S. PATENT DOCUMENTS

| 2,694,415 | 11/1954 | Dillon | 236/100 X |
| 2,769,597 | 11/1956 | Mayo | 236/100 X |
| 3,149,455 | 9/1964 | Daly et al. | 236/100 X |
| 3,841,551 | 10/1974 | Ota | 236/100 X |
| 4,175,696 | 11/1979 | Braukmann | 236/34.5 |
| 4,187,683 | 2/1980 | Northrup, Jr. et al. | 236/100 X |

FOREIGN PATENT DOCUMENTS 2255826  7/1975  France .................... 236/100

Primary Examiner—William E. Tapolcai
Attorney, Agent, or Firm—Birch, Stewart, Kolasch & Birch

[57] ABSTRACT

A wax-pellet thermostat having a valve seat, a piston secured to the valve, a guide member slidably mounted on the piston, a valve secured to the guide member, a diaphragm secured to the guide member, and a wax provided in the cylinder. A gap is provided in the guide member around the piston so as to accumulate coolant which has entered along the piston. The gap is provided to discharge the coolant from the guide member when the wax expands to cause a part of the diaphragm to enter into the gap.

9 Claims, 6 Drawing Sheets

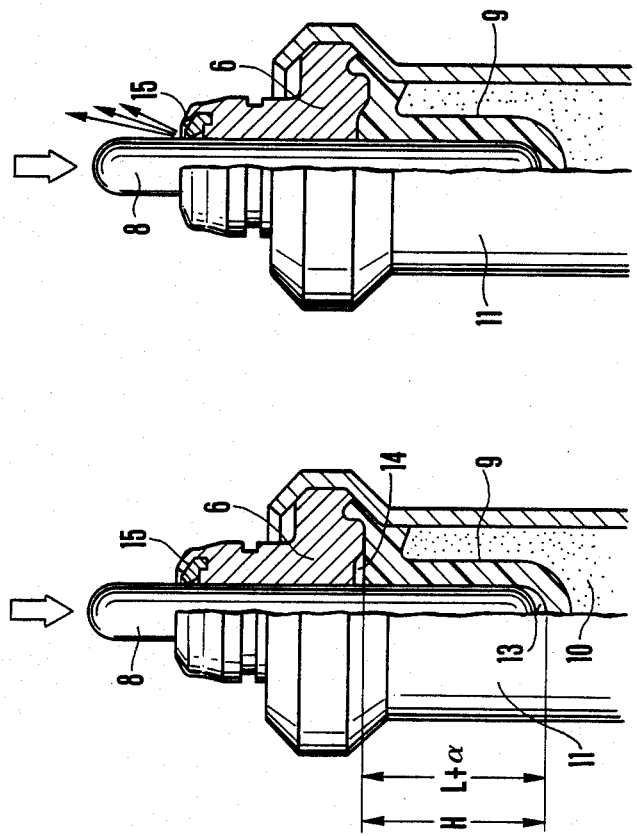

WAX-PELLET THERMOSTAT

BACKGROUND OF THE INVENTION

The present invention relates to a wax-pellet termostat for automotive engines.

The conventional wax-pellet thermostat comprises a thermo-sensitive device and a valve device. The thermo-sensitive device includes a steel piston, a guide member slidably engaged with the piston, a rubber diaphragm around the piston, and a wax. The piston is sealed by a sealing device provided in the guide member. However, if the sealing device deteriorates, a space in the diaphragm is communicated with a coolant passage. Under such a condition, when the temperature of coolant rapidly decreases from high temperature (about 100° C.) to low temperature (below 40° C.), the space in the diaphragm becomes a vacuum. Accordingly, the coolant is inducted into the space. Since the diaphragm tightly grips the piston, the coolant in the space cannot be discharged. As described hereinafter, the valve is slightly raised by the coolant in the space, which causes the opening temperature of the valve to decrease. As a result, the engine is overcooled, thereby reducing the thermal efficiency of the engine and increasing the amount of emissions. The amount of the coolant in the space increases with time, so that the valve lift increases, which causes engine trouble.

SUMMARY OF THE INVENTION

An object of the invention is to provide a thermostat which may automatically discharge the coolant inducted in a space.

Another object of the invention is to provide a thermostat which may prevent the induction of coolant.

According to the present invention, there is provided a thermostat having a housing having a valve seat, a piston secured to the housing, a guide member slidably mounted on the piston, a valve secured to the guide member, a diaphragm secured to the guide member around a lower portion of the piston, a heat conductive cylinder secured to the guide member and surrounding the diaphragm, and a wax provided in the cylinder.

The thermostat has a gap provided at a portion between the guide member and the diaphragm around the piston so as to accumulate coolant entered along the piston and to discharge from the guide member when the wax expands to cause a part of the diaphragm to enter into the gap.

In an aspect of the invention, the gap is formed in the guide member around the piston adjacent the top surface of the diaphragm.

In another aspect of the invention, the gap is formed in the diaphragm at the top thereof, and a seal is provided in the guide member at a top portion thereof around the piston so as to prevent the enter of coolant.

These and other objects and features of the present invention will become more apparent from the following description with reference to the accompanying drawings.

BRIEF DESCRIPTION OF THE DRAWINGS

FIGS. 6 to 8 show the operation of the thermostat of the present invention;

DETAILED DESCRIPTION OF THE PREFERRED EMBODIMENTS

Figure 1:
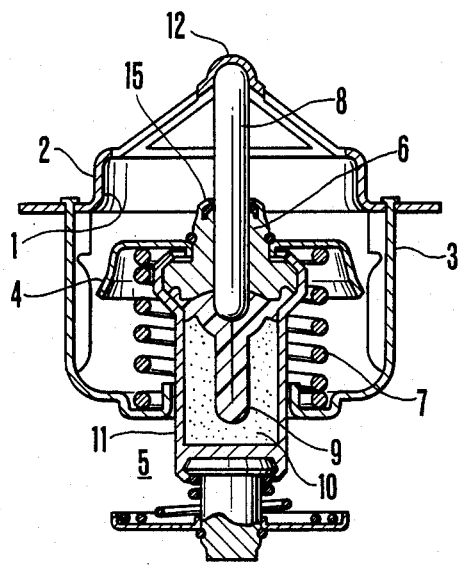
FIGS. 1 and 2 are sectional views of a thermostat of the present invention.
Figure 2:
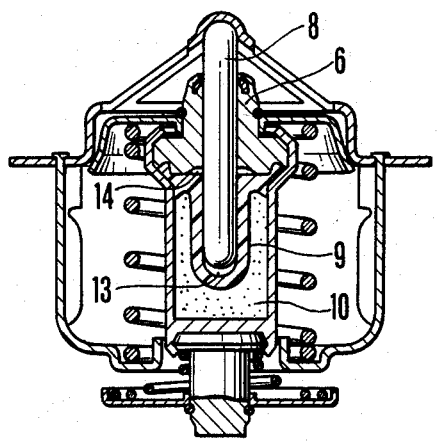

Referring to FIGS. 1 and 2, the thermostat of the present invention comprises a housing 2 forming a valve seat 1, a frame 3 secured to the housing 2. A thermosensitive device 5 comprises a steel piston 8 secured to the housing 2 at top 12, guide member 6 slidably engaged with the piston 8, primary valve 4 secured to the guide member 6, heat conductive cylinder 11 secured to the guide member 6, rubber diaphragm 9 secured to the guide member 6, wax pellet 10 provided in the cylinder 11, and seal packing 15 for preventing counter flow of coolant. A return coil spring 7 disposed surrounding the cylinder 11 is provided between the primary valve 4 and the bottom of the frame 3.

In accordance with the present invention, a gap 14 is formed in the guide member 6 at a portion around the piston 8 and adjacent the top surface of rubber diaphragm 9.

FIG. 2 shows a valve in a closed state. When the temperature of the coolant rises in excess of a predetermined value of the thermostat the wax 10 expands. This forces the rubber diaphragm 9 against the steel piston 8. As the wax squeezes the rubber diaphragm 9 around the piston 8, the wax 10 overcomes the coil spring 7 and the thermo-sensitive device 5 moves downward, thereby opening the valve 4. When the thermostat cools, the wax 10 contracts. Then the coil spring 7 returns the valve to the closed position as shown in FIG. 2. Since a space 13 is formed in the diaphragm 9 at the bottom thereof, the valve 4 is securely pressed against the seat 1.

As shown in FIG. 6, if coolant enters into the thermostat along the piston 8 at low temperature, the coolant enters into the gap 14 and is accumulated therein. Since the diaphragm 9 grips tightly the piston 8, the coolant in the gap does not enter into the space 13 passing through the central hole of the diaphragm 9 When the temperature of the coolant rises to expand the wax 10, a part of the diaphragm enters into the gap 14. Thus, the coolant in the gap 14 is discharged from the thermostat through the seal 15 (FIG. 7). At that time, the coolant discharges together with foreing matter attached the seal 15, thereby cleaning the seal. Accordingly, the durability of the seal 15 is ensured. FIG. 8 shows the device in the full open state.

Figure 3:
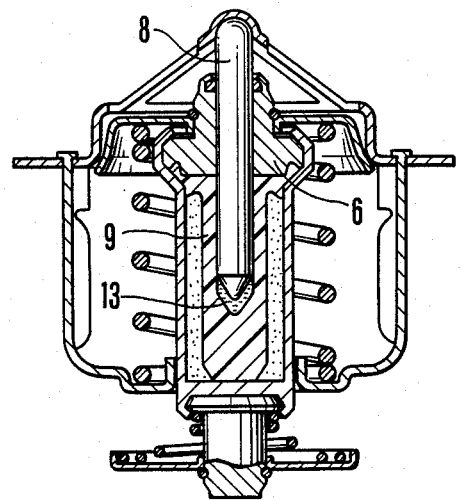
FIGS. 3 and 4 are sectional views of a conventional thermostat.
Figure 4:
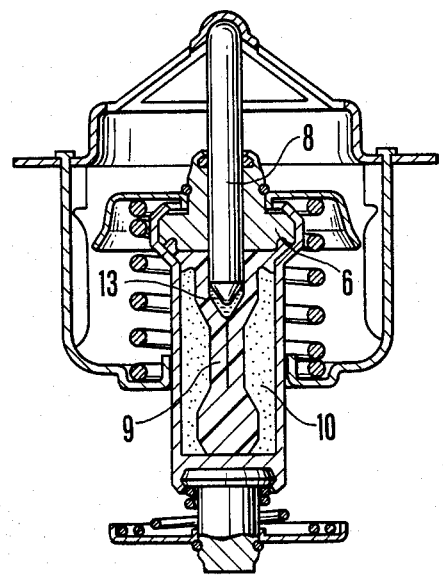
Figure 5:
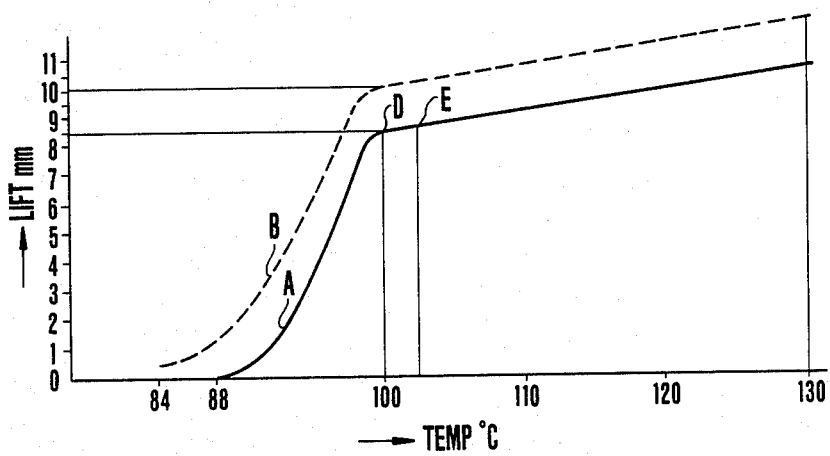
FIG. 5 is a graph showing valve lifts of the thermostat of the present invention and conventional one with respect to temperature.

FIGS. 3 and 4 show a conventional thermostat. A coolant is inducted in space 13 in the diaphragm 9. FIG. 5 shows a valve lift curve A of the thermostat of the present invention shown in FIGS. 1 and 2 and a valve lift curve B of the thermostat shown in FIGS. 3 and 4. The valve 4 of the thermostat of FIG. 2 begins to open at 88° C. and fully opens at 100° C. (point D) where the valve lift is 8.5 mm. Thereafter the valve is lifted by a small increment (0.07 mm per 1° C.) until 130° C. by thermal expansion of the wax 10.

On the other hand, the valve 4 of the thermostat of FIG. 3 in which the coolant is inducted in the diaphragm 9 is fully opened at about 84° C. lower than that of the thermostat of the present invention by 4° C. The full open valve lift becomes 10.1 mm. Further, in the closing state, the valve 4 is not engaged with the valve seat 1, maintaining a gap of about 0.5 mm between the valve and the seat. Accordingly, the engine is overcooled.

In accordance with the present invention, the valve lift is constant. Accordingly, the axial length of the diaphragm can be reduced. Referring to FIG. 6, the length H of the axial hole of the diaphragm is expressed as follows.

$$H = L + \alpha$$

where L is the full open valve lift.

In the thermostat of the present invention, the value $\alpha$ can be set to a small value, for example about 1.4 times as large as the diameter of the piston 8, thereby reducing the axial length of diaphragm Further, it is possible to set the full open valve lift to a higher point than the point D (FIG. 5), such as for example at point E where the valve lift change is very small, so that reliable operation is expected.

The applicant conducted tests of a thermostat of the present inventionby attaching it to an engine operated by a test machine. The engine is cyclically operated by rapidly changing the engine speed between 750 rpm and 5600 rpm. Following are test results after tha operation of 100,000 cycles, in which the values represent changes for initial values.

Valve open temperature: ±0.6° C.
Full open valve lift: −0.2 mm
Leakage of coolant: ±0

As is clearly seen from the above data, the thermostat of the present invention hardly changes in characteristics, even if it is subjected to severe conditions.

Figure 9A:
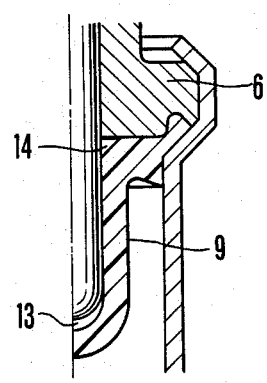
FIGS. 9A and 9B show other embodiments of the invention.
Figure 9B:
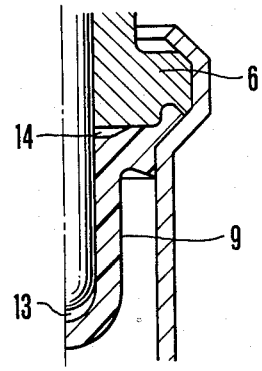
Figure 12:
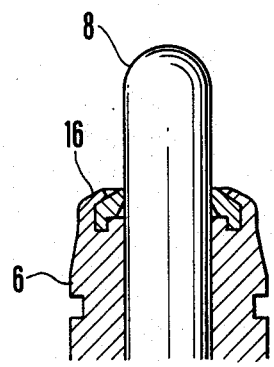
FIGS. 10 to 13 show an assembly of a seal.

In the embodiment of FIG. 9A, a gap 14 having a V-shaped section is provided in the diaphragm 9 at the top surface thereof around the piston 8. In FIG. 9B, a gap 14 having a frustum shape is formed in the diaphragm.

Figure 11:
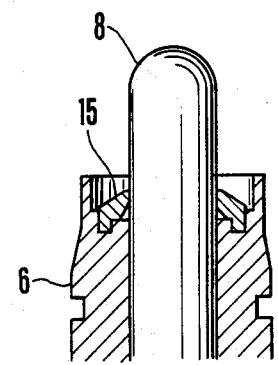
Figure 10:
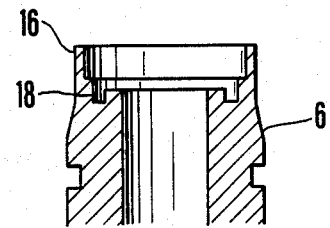
Figure 13:
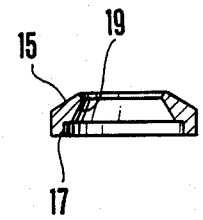

FIG. 13 shows a construction of the counter flow preventing seal packing 15. The packing 15 has an annular projection 17 and an inwardly projected lip 19. As shown in FIG. 10, the guide member 6 has a recess having an annular groove 18 corresponding to the annular projection 17. The projection 17 is engaged with the groove 18 as shown in FIG. 11 and a peripheral projection 16 is inwardly deformed by a predetermined oil pressure, thereby pressing the lip 19 against the piston 8. Thus, the entrance of the coolant into the diaphragm is prevented and discharge of the coolant from the gap 14 is permitted.

Figure 14:
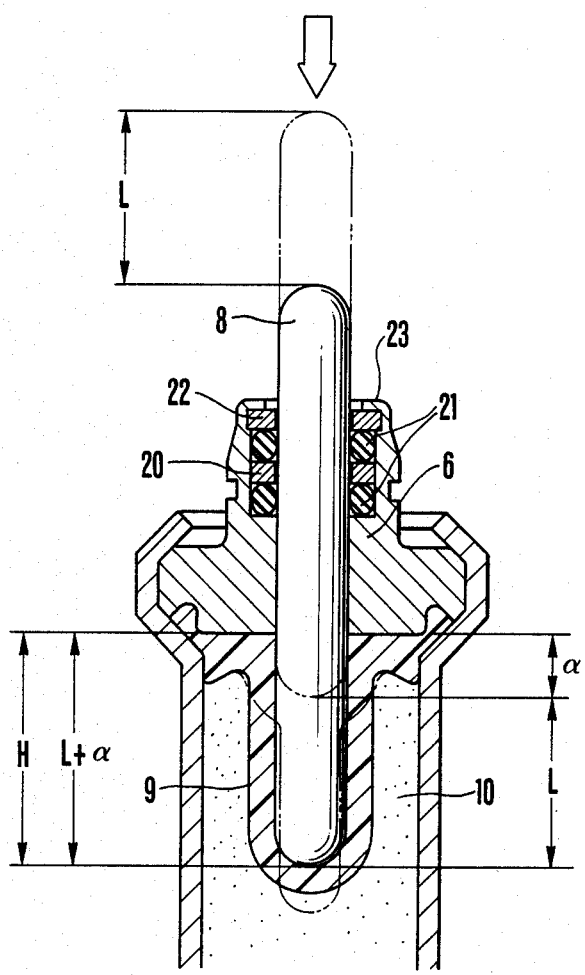
FIG. 14 is a sectionalview of a further embodiment of the invention.

Referring to FIG. 14 showing a further embodiment of the present invention, a central hole of the diaphragm has an axial length $H = L + \alpha$ like the first embodiment, in which $\alpha$ is about 1.4 times as large as the diameter of the piston 8. In the guide member 6, a double O-ring seal device is provided. The seal device comprises a movable separator 20 slidably provided in a recess formed in the guide member 6 and mounted on the piston 8, a pair of O-rings 21 disposed on opposite sides of the separator 20, a fixed cover 22, and a peripheral flange 23 inwardly deformed by a predetermined oil pressure to fix the cover 22. By adjusting the thickness of the movable separator 20, an optimum compression state of each O-ring can be provided.

By such a double O-ring seal device, entrances of coolant and foreign materials can be perfectly prevented.

While the invention has been described in conjunction with preferred specific embodiments thereof, it will be understood that this description is intended to illustrate and not limit the scope of the invention, which is defined by the following claims.

What is claimed is:

1. A thermostat comprising:
    a housing having a valve seat,
    a piston disposed within said housing,
    a guide member slidably mounted around said piston,
    a valve secured to said guide member for moving into and out of said valve seat,
    a coil spring for biasing said valve against said housing,
    a diaphragm secured to said guide member at a lower portion thereof, said diaphragm having an axial pocket for slidably receiving the lower portion of said piston,
    a heat conductive cylinder secured to said guide member and surrounding said diaphragm with a cavity,
    a seal member disposed at a top portion of said guide member around said piston so as to prevent the entrance of coolant between said guide member and said piston, and
    wax disposed in said cavity of said cylinder, said wax expanding when heated so as to cause said diaphragm and said guide member to slidably move upwards along said piston thereby moving said valve into said valve seat against the bias of said coil spring,
    wherein said guide member and said seal spool are arranged so as to form a gap between said guide member and said diaphragm, and around said piston when said wax is in a cooled and unexpanded state, said gap having a predetermined capacity so as to accumulate coolant which may enter between said guide member and said piston through said seal member due to the vacuum generated in said diaphragm, and wherein said guide member and said diaphragm are arranged to discharge accumulated coolant from said guide member when said wax is in a heated and expanded state, said discharge being caused by a part of said diaphragm entering into and filling said gap, said seal member being arranged so as to allow for the discharge of coolant from said gap.

2. The thermostat according to claim 1, wherein said gap is formed in said guide member around said piston and adjacent the top surface of said diaphragm.

3. The thermostat according to claim 1, wherein said gap is formed in said diaphragm at the top portion thereof.

4. The thermostat according to claim 1, wherein said gap is formed in said diaphragm and is V-shaped so as to have a diameter which becomes smaller in the direction towards the bottom of said diaphragm.

5. The thermostat according to claim 1, wherein said gap is formed in said diaphragm and is frustum-shaped so as to have a diameter which becomes smaller in the direction towards the bottom of said diaphragm.

6. The thermostat according to claim 1, wherein said guide member has a peripheral projection formed on the top edge thereof and has an annular groove formed in the top portion thereof, and wherein said seal member comprises:

a lower annular projection for fitting into said annular groove of said guide member and an upper inwardly projecting lip, which is inwardly pressed by said peripheral projection of said guide member, for preventing coolant from entering between said piston and said guide member and for allowing coolant to be discharged from said gap.

7. The thermostat according to claim 1, wherein said axial pocket in said diaphragm has a length equal to the sum of the distance of the full open valve lift when the wax is in a heated, expanded state and the distance of about 1.4 times the diameter of said piston.

8. The thermostat according to claim 6, wherein said axial pocket in said diaphragm has a length equal to the sum of the distance of the full open valve lift when the wax is in a heated, expanded state and the distance of about 1.4 times the diameter of said piston.

9. The thermostat according to claim 7, further comprising a seal member disposed at a top portion of said guide member around said piston so as to prevent the entrance of coolant between said guide member and said piston, said seal member providing for the discharge of coolant from said gap.

* * * * *